United States Patent [19]
Ono

[11] Patent Number: 5,162,919
[45] Date of Patent: Nov. 10, 1992

[54] LIGHT BEAM SCANNING APPARATUS USING SEQUENTIALLY ACTIVATED SHUTTERS AND LIGHT SOURCES

[75] Inventor: Shuji Ono, Kanagawa, Japan

[73] Assignee: Fuji Photo Film Co., Ltd., Kanagawa, Japan

[21] Appl. No.: 640,456

[22] Filed: Jan. 11, 1991

[30] Foreign Application Priority Data

Jan. 12, 1990 [JP] Japan .................. 2-5422

[51] Int. Cl.⁵ .................. G03G 15/04; G02F 1/13
[52] U.S. Cl. .................. 358/302; 346/160; 355/70; 355/71
[58] Field of Search ............ 358/482, 475, 480, 483, 358/302; 250/208.1, 553; 355/70, 71, 18, 20, 52, 54, 56, 68, 69; 346/160, 160.1, 107 R, 107 A

[56] References Cited

U.S. PATENT DOCUMENTS

| | | |
|---|---|---|
| 4,258,264 | 3/1981 | Kotera et al. |
| 4,276,473 | 6/1981 | Kato et al. ............ 250/337 |
| 4,315,318 | 2/1982 | Kato et al. ............ 250/337 |
| 4,357,625 | 11/1982 | Lamberts et al. ............ 358/75 |
| 4,387,428 | 6/1983 | Ishida et al. |
| 4,596,995 | 6/1986 | Yamakawa et al. ............ 358/302 |
| 4,639,608 | 1/1987 | Kuroda ............ 358/475 |
| 4,783,146 | 11/1988 | Stephany et al. ............ 346/160 |

FOREIGN PATENT DOCUMENTS

| | | |
|---|---|---|
| 56-11395 | 2/1981 | Japan . |
| 61-5193 | 2/1986 | Japan . |
| 0185760 | 8/1986 | Japan ............ 355/70 |
| 2120040 | 11/1983 | United Kingdom ............ 358/302 |

OTHER PUBLICATIONS

"Solid State Data Recorder ... Digital Tech. Review" *Computer Design*, p. 60, Sep. 1979.

Primary Examiner—Edward L. Coles, Sr.
Assistant Examiner—Jill Jackson
Attorney, Agent, or Firm—Sughrue, Mion, Zinn, Macpeak & Seas

[57] ABSTRACT

A light beam scanning apparatus includes a light source array composed of a plurality of light sources, which are arrayed in a predetermined direction, a shutter array composed of a plurality of electric shutters, which are arrayed in a direction corresponding to the predetermined direction, and a lens array composed of a plurality of lenses is located at positions corresponding to the positions of the electric shutters of the shutter array. The lenses form images of light beams, which are produced by the plurality of the light sources, as light spots having predetermined diameters on a material. A control circuit controls the timing, with which the light beams are produced by the plurality of the light sources, and the timing, with which the plurality of the electric shutters are opened and closed, such that the material may be scanned with the light spots.

7 Claims, 3 Drawing Sheets

LIGHT BEAM SCANNING APPARATUS USING SEQUENTIALLY ACTIVATED SHUTTERS AND LIGHT SOURCES

BACKGROUND OF THE INVENTION

1. Field of the Invention

This invention relates to a light beam scanning apparatus, which is used in an image read-out apparatus, a laser printer, or the like for scanning a material is with a light spot.

2. Description of the Prior Art

Image recording and reproducing systems have heretofore been used in various fields. With image recording and reproducing systems, a recording medium, on which an image has been recorded, is scanned with a light beam, and an image signal is thereby detected from the recording medium. Appropriate image processing is carried out on the image signal. A light beam is then modulated in accordance with an image signal which has been obtained from the image processing. A recording medium, which is sensitive to the modulated light beam, is scanned with the modulated light beam, and a visible image is thereby reproduced on the recording medium.

For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on photographic film or the like. In this manner, a visible image having good image quality with high contrast, high sharpness, high graininess, or the like, can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with layer of the stimulable phosphor (hereinafter referred to as a stimulable phosphor sheet) is first exposed to radiation which has passed through an object, such as the human body A radiation image of the object is thereby stored on the stimulable phosphor sheet. The stimulable phosphor sheet is then scanned with stimulating rays, such as a laser beam, which cause the stimulable phosphor sheet to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In the aforesaid image recording and reproducing systems which utilize X-ray film, stimulable phosphor sheets, or the like, and in various other systems which process general images, image read-out apparatuses are used in order to detect an image signal from a recording medium on which an image has been recorded (e.g. X-ray film or a stimulable phosphor sheet). In general, in the image read-out apparatuses, a recording medium, on which an image has been recorded, is scanned with a light beam. Light, which represents the image and is radiated out of the recording medium when it is scanned with the light beam, is detected and converted into an image signal by a photodetector. (For example, in cases where the recording medium is X-ray film, light which has passed through the X-ray film, or light which has been reflected by the X-ray film, is detected. In cases where the recording medium is a stimulable phosphor sheet, which is scanned with stimulating rays, the stimulable phosphor sheet emits light in proportion to the amount of energy stored thereon during its exposure to the radiation. The emitted light is detected.) In order for a visible image to be reproduced from the image signal, an image reproducing apparatus is used wherein intensity of a light beam is modulated in accordance with the image signal, and a recording medium, such as photographic film, is scanned with the modulated light beam.

In general, in order to scan a recording medium with a light beam in the aforesaid image read-out apparatus or the aforesaid image reproducing apparatus, a mechanical deflector, such as a rotating polygon mirror or a galvanometer mirror, is employed. However, mechanical movable parts of such a deflector generate vibration, which adversely affects the image read-out operations or the image reproducing operations. Also, the mechanical deflector cannot be kept small in size, and the service life of the mechanical movable parts is not long.

SUMMARY OF THE INVENTION

The primary object of the present invention is to provide a light beam scanning apparatus which has no mechanical movable parts.

Another object of the present invention is to provide a light beam scanning apparatus which is small in size, free of mechanical vibration and has a long service life.

The present invention provides a light beam scanning apparatus comprising:

i) a light source array composed of a plurality of light sources, which are arrayed in a predetermined direction, ii) a shutter array composed of a plurality of electric shutters, which are arrayed in a direction corresponding to the predetermined direction, iii) a lens array composed of a plurality of lenses, which are located at positions corresponding to the positions of the electric shutters of said the shutter array, the lenses forming images of light beams, which are produced by the plurality of the light sources, as light spots having predetermined diameters on a material, and iv) a control circuit for controlling the timing, with which the light beams are produced by the plurality of the light sources, and the timing, with which the plurality of the electric shutters are opened and closed, such that the material may be scanned with said light spots.

The term "electric shutter" as used herein means a shutter, which has no mechanical movable part and can be opened and closed with an electric signal. For example, the electric shutter may be constituted of a liquid crystal, a PLZT, or the like, such that the light transmittance ma be changed.

The light beam scanning apparatus in accordance with the present invention comprises the light source array, the shutter array, the lens array, and the control circuit. The control circuit controls the timing, with which the light beams are produced by the plurality of the light sources, and the timing, with which the plurality of the electric shutters are opened and closed, such that the material may be scanned with light spots. Therefore, with the light beam scanning apparatus in accordance with the present invention, scanning with a light beam can be achieved without any mechanical movable part being used. Accordingly, the light beam scanning apparatus in accordance with the present invention can be kept small in size and free of mechanical vibration, while having a long service life.

Also, in cases where the timing, with which the light beams are produced by the plurality of the light sources, and the timing, with which the plurality of the electric shutters are opened and closed, are controlled in specific ways, a single scanning line can be divided into a plurality of parts, and the plurality of the parts of the scanning line can be scanned simultaneously. Therefore, the scanning can be carried out quickly.

DESCRIPTION OF THE PREFERRED EMBODIMENTS

The present invention will hereinbelow be described in further detail with reference to the accompanying drawings.

Figure 1:
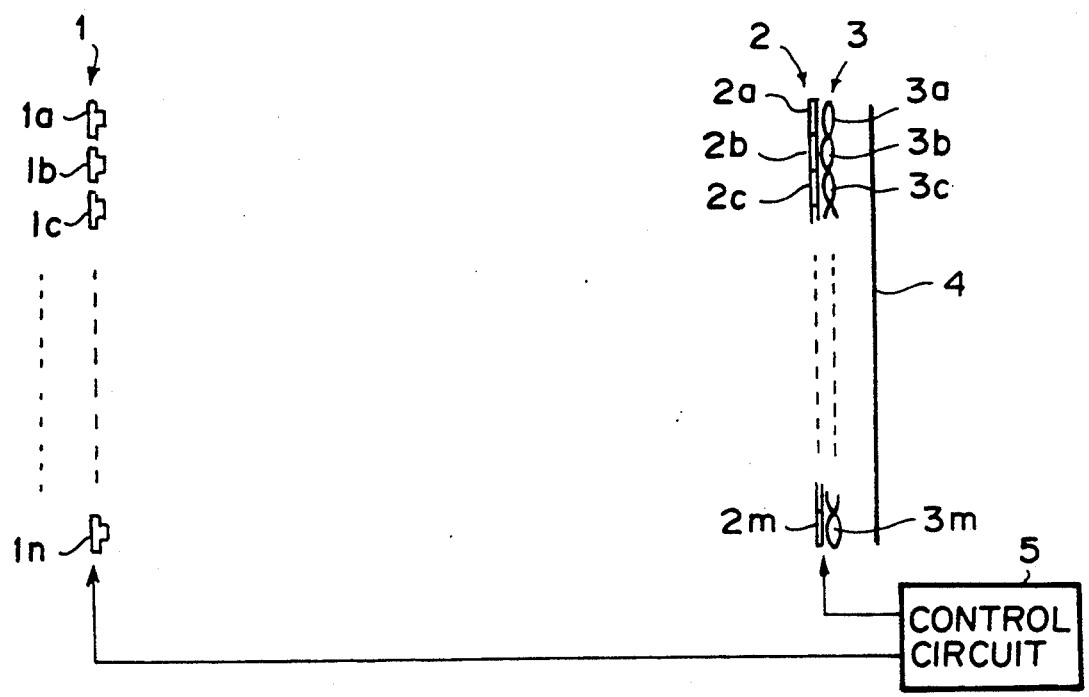
FIG. 1 is a schematic view showing an embodiment of the light beam scanning apparatus in accordance with the present invention.

FIG. 1 is a schematic view showing an embodiment of the light beam scanning apparatus in accordance with the present invention.

With reference to FIG. 1, a light source array 1 comprises a plurality of light sources $1a$, $1b$, $1c$, ..., $1n$. The light sources $1a$, $1b$, $1c$, ..., $1n$ are turned on with predetermined timing in order to produce light beams. The light beams, which have been produced by the light sources $1a$, $1b$, $1c$, ..., $1n$, impinge upon liquid crystal shutters $2a$, $2b$, $2c$, ..., $2m$, which constitute a shutter array 2. A certain liquid crystal shutter among the liquid crystal shutters $2a$, $2b$, $2c$, $2m$ is opened. The light beams, which have been produced by the light sources $1a$, $1b$, $1c$, ..., $1n$, pass through the liquid crystal shutter, which has been opened. The light beams, which have passed through the opened liquid crystal shutter, impinge upon one of lenses $3a$, $3b$, $3c$, ..., $3m$ of a lens array 3, which corresponds to the opened liquid crystal shutter. The lens corresponding to the opened liquid crystal shutter forms images of the light beams as light spots having predetermined diameters on a recording medium 4. A control circuit 5 controls the timing, with which the light beams are produced by the light sources $1a$, $1b$, $1c$, $1n$, and the timing, with which the liquid crystal shutters $2a$, $2b$, $2c$, ..., $2m$ are opened and closed, such that the recording medium 4 may be scanned with the light spots. In cases where 10 light sources are employed as the light sources $1a$, $1b$, $1c$, ..., $1n$ and 100 liquid crystal shutters are employed as the liquid crystal shutters $2a$, $2b$, $2c$, ..., $2m$, the recording medium 4 can be scanned with 1,000 light spots.

Figure 2:
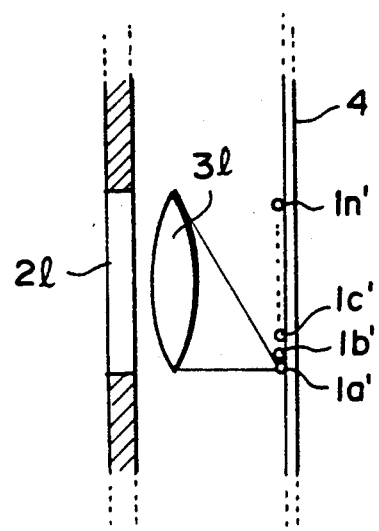
FIG. 2 is an enlarged view showing part of the embodiment of FIG. 1 in the vicinity of a recording medium.

FIG. 2 is an enlarged view showing part of the embodiment of FIG. 1 in the vicinity of the recording medium 4.

With reference to FIG. 2, only a liquid crystal shutter 21 is opened, and the light sources $1a$, $1b$, $1c$, ..., $1n$ are turned on pulse-wise in this order. As a result, light spots are sequentially formed at positions $1a'$, $1b'$, $1c'$, ..., $1n'$ on the recording medium 4 in this order. In this manner, part of the recording medium 4 is scanned with the light spots.

Figure 3:
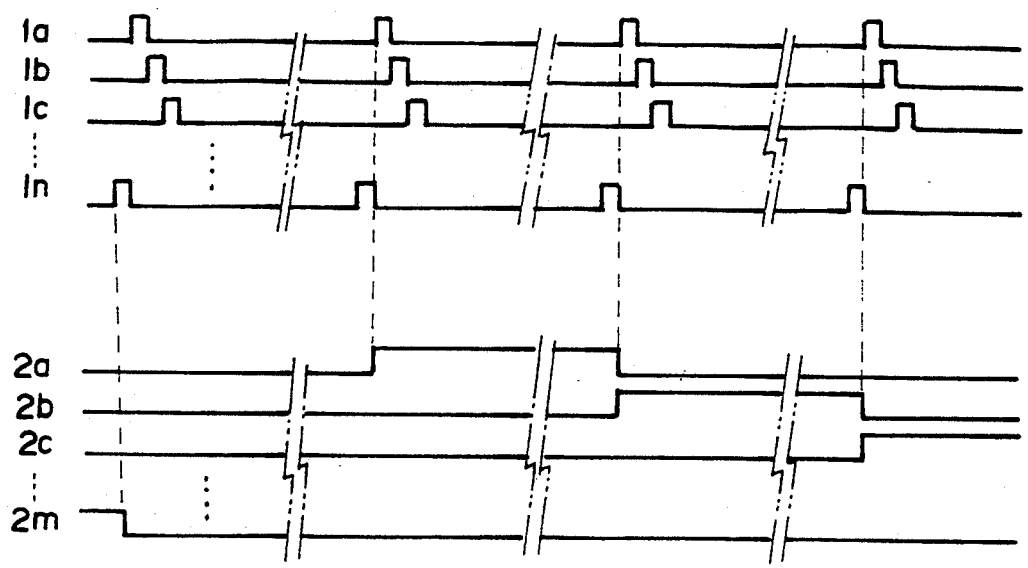
FIG. 3 is a timing chart showing examples of the timing, with which light beams are produced by a plurality of light sources shown in FIG. 1, and the timing, with which a plurality of liquid crystal shutters shown in FIG. 1 are opened and closed.

FIG. 3 is a timing chart showing examples of the timing, with which light beams are produced by a plurality of light sources $1a$, $1b$, $1c$, ..., $1n$, and the timing, with which a plurality of liquid crystal shutters $2a$, $2b$, $2c$, ..., $2m$ are opened and closed. The control circuit 5 shown in FIG. 1 controls the timing in the manner illustrated in FIG. 3. In FIG. 3, as an aid in facilitating the explanation, lines representing the timing, with which light beams are produced by the plurality of light sources $1a$, $1b$, $1c$, ..., $1n$ shown in FIG. 1, and the timing, with which the plurality of liquid crystal shutters 2a, 2b, 2c, ..., 2m shown in FIG. 1 are opened and closed, are numbered with the same reference numerals as those of the light sources and the liquid crystal shutters shown in FIG. 1.

With reference to FIG. 3, first, the liquid crystal shutter 2a is opened, and the light sources 1a, 1b, 1c, ..., 1n are sequentially turned on while the liquid crystal shutter 2a is being open. Thereafter, the liquid crystal shutter 2b is opened, and the light sources 1a, 1b, 1c, ..., 1n are sequentially turned on while the liquid crystal shutter 2b is being open. The light sources 1a, 1b, 1c, ..., are turned on by the pulses illustrated in FIG. 3. Such operations are carried out also for the liquid crystal shutters 2c, ..., 2m. In this manner, the recording medium 4 is scanned with the light spots from one edge to the other edge thereof.

Figure 4:
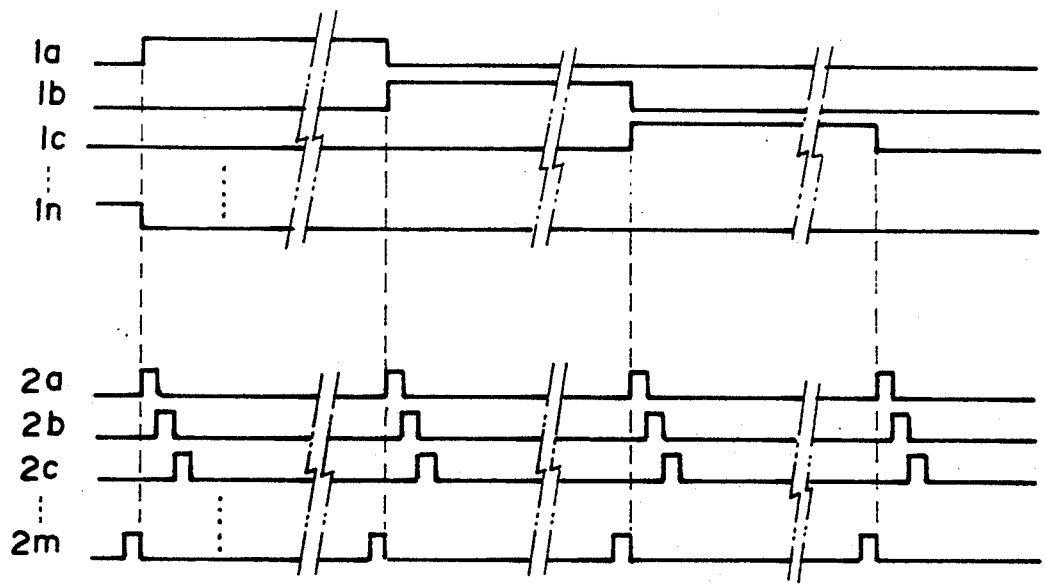
FIG. 4 is a timing chart showing different examples of the timing, with which light beams are produced by a plurality of light sources shown in FIG. 1, and the timing, with which a plurality of liquid crystal shutters shown in FIG. 1 are opened and closed.

FIG. 4 is a timing chart showing different examples of the timing, with which light beams are produced by a plurality of light sources 1a, 1b, 1c, ..., 1n, and the timing, with which a plurality of liquid crystal shutters 2a, 2b, 2c, ..., 2m are opened and closed.

With reference to FIG. 4, first, parts of the recording medium 4, which are spaced apart from one another, are scanned with the light spots, which are determined by the combinations of the light source 1a and the liquid crystal shutters 2a, 2b, 2c, ..., 2m. Thereafter, other parts of the recording medium 4, which are spaced apart from one another, are scanned with the light spots, which are determined by the combinations of the light source 1b and the liquid crystal shutters 2a, 2b, 2c, ..., 2m. Such operations are carried out also for the remaining parts of the recording medium 4 with the combinations of the light sources 1c, ..., 1n and the liquid crystal shutters 2a, 2b, 2c, ..., 2m. In this manner, the scanning is ultimately completed for a single scanning line on the recording medium 4.

Alternatively, in cases where the light beam scanning apparatus in accordance with the present invention is employed in, for example, an image reproducing apparatus, different parts of a single scanning line on the recording medium 4 may be scanned simultaneously, and the scanning may thereby be carried out more quickly. For this purpose, the pulse widths of the light beams produced by the light sources 1a, 1b, 1c, 1n and the amounts of the light beams per unit time may be controlled appropriately, and/or the transmittances of the liquid crystal shutters 2a, 2b, 2c, 2m may be controlled appropriately. In this manner, for example, light beams may be produced simultaneously by a plurality of light sources (the amounts of the light beams may be controlled at the same time), and/or a plurality of liquid crystal shutters may be opened simultaneously (and the transmittances of the liquid crystal shutters may be controlled at the same time).

Figure 5:
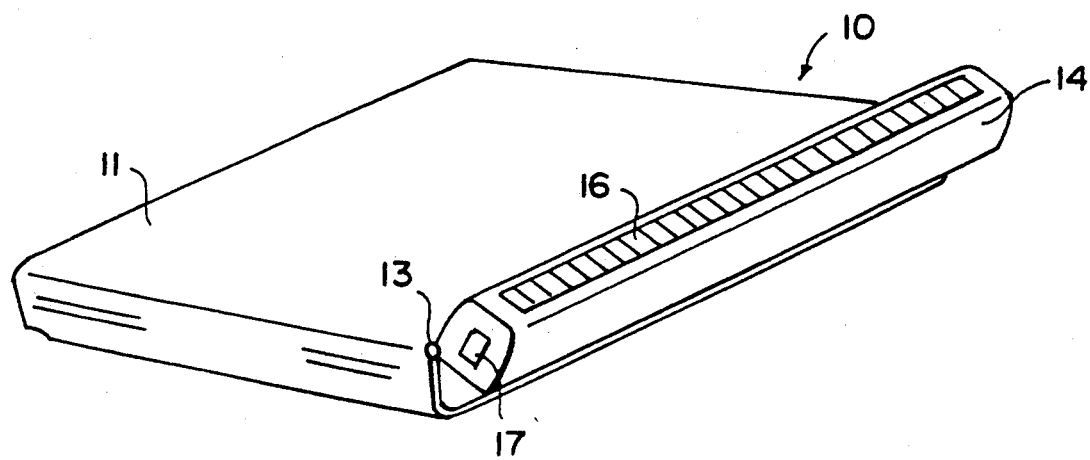
FIG. 5 is a perspective view showing an example of a cassette to be loaded into an image read-out apparatus, wherein an embodiment of the light beam scanning apparatus in accordance with the present invention is employed.
Figure 6:
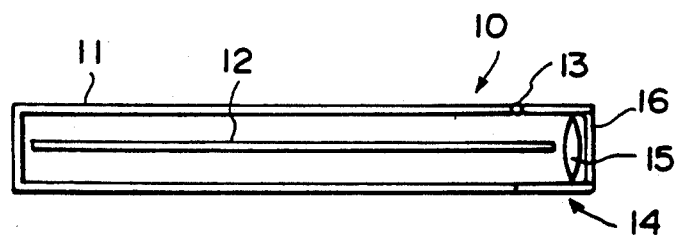
FIG. 6 is a cross-sectional view showing the cassette of FIG. 5.

FIG. 5 is a perspective view showing an example of a cassette to be loaded into an image read-out apparatus, wherein an embodiment of the light beam scanning apparatus in accordance with the present invention is employed. FIG. 6 is a cross-sectional view showing the cassette of FIG. 5.

In the image read-out apparatus described below, an X-ray image, which has been stored on a stimulable phosphor sheet, is read out, and an image signal is thereby generated.

With reference to FIGS. 5 and 6, a cassette 10 is provided with a housing 11, which blocks external light, such as sunlight, and transmits X-rays. The housing 11 may be constituted of, for example, aluminium. A stimulable phosphor sheet 12, on which an X-ray image has been stored in the manner described below, is incorporated in the housing 11. The cassette 10 also has a cover 14 at one edge part, which cover can be opened and closed around a hinge 13. The cover 14 is provided with a lens array 15, a liquid crystal shutter array 16, and a connector 17. The connector 17 transmits signals for controlling the opening and closing of liquid crystal shutters of the liquid crystal shutter array 16.

In an X-ray image recording apparatus (not shown), X-rays are irradiated to an object. The X-rays, which have passed through the object, pass through the housing 11 of the cassette 10 and impinge upon the stimulable phosphor sheet 12 housed in the cassette 10. In this manner, an X-ray image of the object is stored on the stimulable phosphor sheet 12. The stimulable phosphor sheet 12, on which the X-ray image has been stored and which is housed in the cassette 10, is loaded into the image read-out apparatus.

Figure 7:
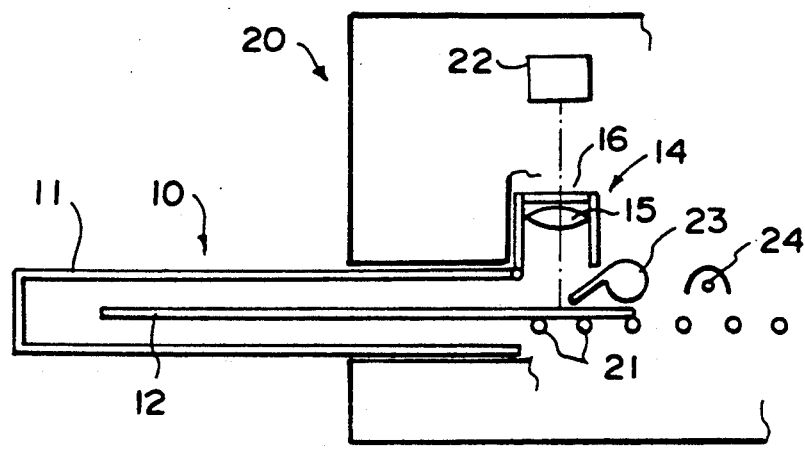
FIG. 7 is a schematic view showing an image read-out apparatus in which the cassette shown in FIGS. 5 and 6 is loaded.

FIG. 7 is a schematic view showing an image read-out apparatus in which the cassette 10 is loaded.

With reference to FIG. 7, when the cassette 10 is loaded into an image read-out apparatus 20, the cover 14 is rotated approximately 90°. A conveyance unit 21 is then operated to convey the stimulable phosphor sheet 12 out of the cassette 10 in a sub-scanning direction. While the stimulable phosphor sheet 12 is thus conveyed in the sub-scanning direction, a plurality of light sources of a light source array 22 are sequentially turned on with pulses. Also, liquid crystal shutters of the liquid crystal shutter array 16 are opened and closed appropriately. In this manner, the stimulable phosphor sheet 12 is scanned in two directions. When the stimulable phosphor sheet 12 is exposed to a light spot, the exposed portion of the stimulable phosphor sheet 12 emits light in proportion to the amount of energy stored thereon during its exposure to the X-rays. The emitted light is detected by a photoelectric converter 23, and an image signal representing the X-ray image, which was stored on the stimulable phosphor sheet 12, is thereby generated. An erasing light source 24 is located on the downstream side of the photoelectric converter 23. The erasing light source 24 irradiates erasing light to the stimulable phosphor sheet 12 and erases any energy remaining thereon. In this manner, immediately after the X-ray image has been read out of the stimulable phosphor sheet 12, the erasing operation is carried out. The stimulable phosphor sheet 12 can then be reused in the recording of an X-ray image. After the image read out and erasing operations have been carried out for the whole area of the stimulable phosphor sheet 12, the stimulable phosphor sheet 12 is housed in the cassette 10.

In the image read-out apparatus described above, an X-ray image, which has been stored on a stimulable phosphor sheet, is read out. However, the light beam scanning apparatus in accordance with the present invention, is also applicable when various other types of images which are read out by image read-out apparatuses.

Also, the light beam scanning apparatus in accordance with the present invention is also applicable in image recording apparatuses.

I claim:

1. A light beam scanning apparatus comprising:
  i) a light source array composed of a plurality of light sources, which are arrayed in a predetermined direction, ii) a shutter array composed of a plurality of electric shutters, which are arrayed in a direction corresponding to said predetermined direction,
iii) a lens array composed of a plurality of lenses, which are located at positions corresponding to the positions of said electric shutters of said shutter array, said lenses forming images of light beams, which are produced by the plurality of said light sources, as light sports having predetermined diameters on a material, and
iv) a control circuit for controlling the timing, with which the light beams are produced by the plurality of said light sources by independently turning on and off the plurality of said light sources, and the timing, with which the plurality of said electric shutters are opened and closed, such that said material may be scanned with said light spots.

2. An apparatus as defined in claim 1 wherein said electric shutters are constituted of liquid crystals.

3. An apparatus as defined in claim 1 wherein said control circuit controls said timing such that a single scanning line may be divided into a plurality of parts, and the plurality of said parts of the scanning line may be scanned simultaneously.

4. An apparatus as defined in claim 1 wherein said control circuit controls said timing such that a first electric shutter of the plurality of said electric shutters is first opened, the plurality of said light sources are sequentially turned on while said first electric shutter is open, thereafter said first electric shutter is closed and a second electric shutter of the plurality of said electric shutters is opened, and the plurality of said light sources are sequentially turned on while said second selectric shutter is open.

5. An apparatus is defined in claim 1 wherein said control circuit controls said timing such that a first light source of the plurality of said light sources is first turned on, the plurality of said electric shutters are sequentially opened while said first light source is on, thereafter said first light source is turned off and a second light source of the plurality of said light sources is turned on, and the plurality of said electric shutters are sequentially opened while said second light source is on.

6. An apparatus for scanning a material, comprising:
a light source array having a plurality of light sources arranged in a line in a predetermined direction, each of said light sources producing a light beam;
a shutter array having a plurality of electric shutters arranged in a line in the predetermined direction;
a lens array having a plurality of lenses, each of said lenses corresponding to one of said electric shutters, and each of said lenses producing a light spot based on one of said light sources; and
a control circuit for controlling said light source array and said shutter array such that scanning is performed using the light spots, said control circuit controls said apparatus such that a first electric shutter of said electric shutters is first opened, said light sources are sequentially turned on while said first electric shutter is open, thereafter said first electric shutter is closed and a second electric shutter of said electric shutters is opened, and said light sources are sequentially turned on while said second electric shutter is open.

7. An apparatus for scanning a material, comprising:
a light source array having a plurality of light sources arranged in a line in a predetermined direction, each of said light sources producing a light beam;
a shutter array having a plurality of electric shutters arranged in a line in the predetermined direction;
a lens array having a plurality of lenses, each of said lenses corresponding to one of said electric shutters, and each of said lenses producing a light spot based on one of said light sources; and
a control circuit for controlling said light source array and said shutter array such that scanning is performed using the
a control circuit for controlling said light source array and said shutter array such that scanning is performed using the light spots, said control circuit controls said apparatus such that a first light source of said light sources in first turned on, said electric shutters are sequentially opened while said first light source is on, thereafter said first light source is turned off and a second light source of said light source is turned on, and said electric shutters are sequentially opened while said second light source is on.

* * * * *